L. G. KING.
AIR PUMP CONNECTOR FOR AUTOMOBILES.
APPLICATION FILED FEB. 9, 1916.
1,344,539.
Patented June 22, 1920.
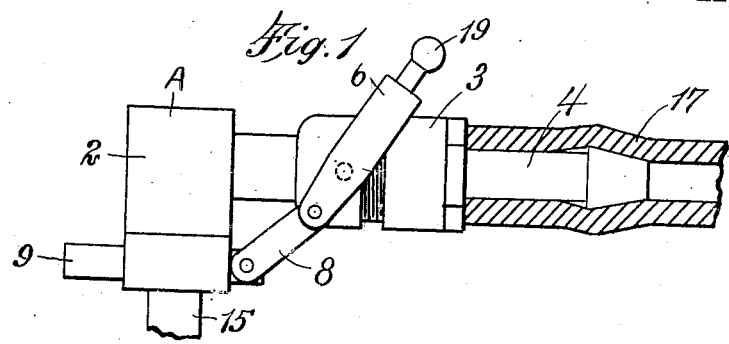
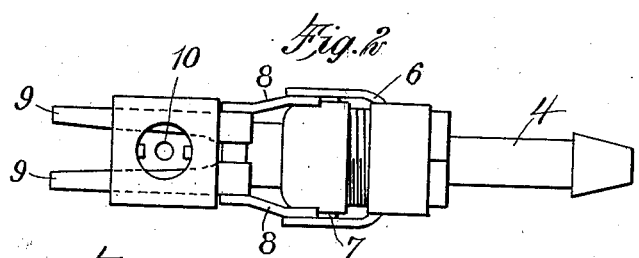
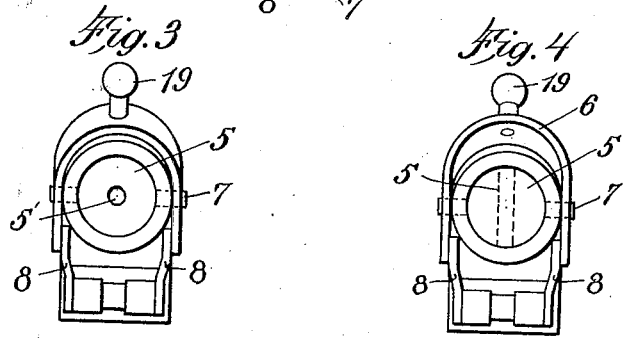 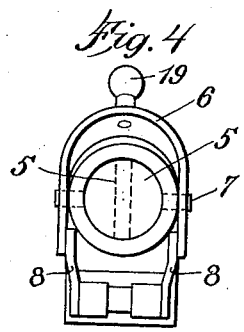
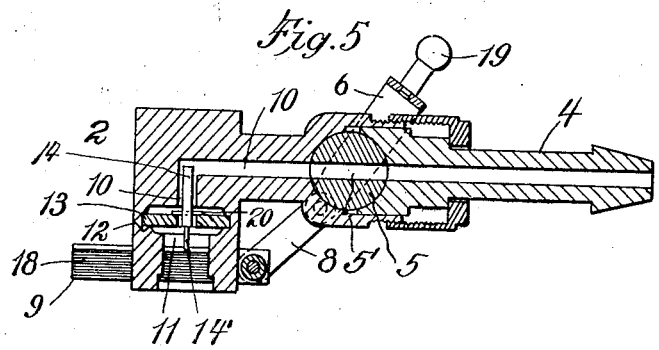
Witnesses:
H. Walley
M. F. Terry
Inventor
Lewis G. King
By Attorney
F. N. Gilbert

UNITED STATES PATENT OFFICE.

LEWIS G. KING, OF DEPOSIT, NEW YORK.

AIR-PUMP CONNECTOR FOR AUTOMOBILES.

1,344,539.   Specification of Letters Patent.   Patented June 22, 1920.

Application filed February 9, 1916. Serial No. 77,260.

*To all whom it may concern:*

Be it known that I, LEWIS G. KING, a citizen of the United States, residing at Deposit, in the county of Broome and State of New York, have invented certain new and useful Improvements in Air-Pump Connectors for Automobiles, of which the following is a specification.

My invention relates to an improvement in air pump connectors for automobiles in which an automatic connection may be made from the air hose to the valve stem of the auto tire and the connection held firmly in attachment with the stem, the air being applied at the same moment and it has for its object to provide a simple air connecting valve and attachment in which the clamping and inlet of air are produced simultaneously in one movement and released.

With this object in view my invention consists in certain novel features of construction and arrangement of parts as will be hereinafter fully described and pointed out in the claim, reference being had to the accompanying drawings in which—

Figure 1 is a side view of my device. Fig. 2 is a bottom plan view of my device. Fig. 3 is an end view of a part of my device. Fig. 4 is an end view of a part of my device in another position. Fig. 5 is a side view in cross section of my device.

The same reference characters denote like parts in each of the several figures of the drawings.

In carrying out my invention I provide a valve box A which valve box is formed of the head 2, the valve seat 3 and the hose tube neck 4. Mounted within the valve seat I have a turnable valve 5 through which is an opening 5'. Pivotally mounted on the outside of the valve seat I have a bail 6 which is rigidly attached to the trunnions 7 secured to the valve and on which the valve is turnable mounted. Pivotally connecting with bail 6 I have the lever arms 8, 8, which have pivotal connection with the sliding bars 9, 9 passing through the valve box A. Through the valve seat 3 and valve box A I have a tubular opening 10 for the passage of air and at the termination thereof in valve box A I have the recess or chamber 11. The sliding bars 9, 9 are slidably mounted in valve box A on either side of the recess chamber 11 and pass through the chamber 11. In chamber 11 I have also a seat 12 in which seat 12 I have mounted a rubber disk 13. Also I have mounted in the tubular passage 10 a plunger 14, which plunger 14 penetrates the rubber disk 13. The plunger 14 may have a reduced portion 14' and may also be provided with some means to prevent the plunger dropping through the rubber disk, such as a cross pin 20. The object of chamber 11 is to form an entrance-way for the valve stem 15 of the tire and when applied to the valve stem 15 it forms a cap over the same. When the valve box A is pressed down upon the valve stem 15 the plunger 14 enters the valve stem 15 and is raised until its upper end engages the upper portion of the passage 10. Upon further movement of the valve box downwardly the plunger 14 opens the check valve in the valve stem 15 and the rubber disk 13 comes in contact with the end of the valve stem 15 and allows no air to escape except through the tubular passage 10, and against the plunger 14 and so on into the valve stem of the auto tire. When the valve stem enters chamber 11 by the movement of the bail 6 I move the lever connections 8, 8 and the bars 9, 9, which bars 9, 9 are drawn inward when not in use for holding the valve stem and which when pushed outward pass by the valve stem, one on either side and grip it and the same movement of bail 6 in moving the bars 9, 9 turns the trunnions 7 of the valve so that the opening 5¹ in valve 5 is in alinement with the tube 10 and allows the air from hose 17 to pass into the tube 10 and so down into chamber 11 and into valve stem 15. Thus by one movement of the bail 6 the valve box A is gripped firmly about the valve stem of the auto tire and the valve opened and the air let into the valve stem.

It is to be noted that the bars 9, 9 are very slightly wedge shaped, as shown in Fig. 2, so that as they move forward they clamp about the valve stem with increased tensity. Also it is to be noted that the interior face of each of the bars 9, 9 are corrugated, as shown in Fig. 5 with the corrugated surface 18, 18 to grip about the valve stem.

When I desire to remove the valve box A from the valve stem 15 I take hold of knob 19 mounted on bail 6 and move forward bail 6 which closes the valve and at the same time draws inward the bars 9, 9 from around the valve 15 and thus releases the contact between the valve box A and the bars from the valve stem and out of the opening 11.

Having thus described my invention, what I claim as new and for which I desire Letters Patent is as follows:

An air pump connector comprising a head having a recess and a passage extending from said recess outwardly to receive an air valve stem, a neck extending at an angle from said head and having an enlarged outer end, a chamber in said enlarged end provided with a valve seat connected by a bore with said recess, a rotatable valve in said valve seat, a tubular connection having means on one end to attach an air hose, and an enlargement on the other end furnished with a coöperating seat for said valve and fitted into said chamber, a cap nut for holding said valve seats in engagement with the valve, an operating handle for the valve, a pair of wedge bars slidable in said head on opposite sides of the passage leading from the recess, and connecting links between said valve handle and said wedge bars.

In testimony whereof I have affixed my signature in the presence of two witnesses.

LEWIS G. KING.

Witnesses:
 H. WALLEY,
 M. F. TERRY.